(12) United States Patent
Uryu et al.

(10) Patent No.: US 10,077,070 B2
(45) Date of Patent: Sep. 18, 2018

(54) POWER-SOURCE VOLTAGE DIAGNOSTIC DEVICE OF ELECTRIC POWER STEERING APPARATUS

(71) Applicant: NSK LTD., Tokyo (JP)

(72) Inventors: Kyosho Uryu, Tokyo (JP); Shin Kumagai, Tokyo (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 97 days.

(21) Appl. No.: 15/102,387

(22) PCT Filed: Jun. 12, 2015

(86) PCT No.: PCT/JP2015/066969
§ 371 (c)(1),
(2) Date: Jun. 7, 2016

(87) PCT Pub. No.: WO2015/190585
PCT Pub. Date: Dec. 17, 2015

(65) Prior Publication Data
US 2018/0162440 A1    Jun. 14, 2018

(30) Foreign Application Priority Data

Jun. 13, 2014    (JP) .................. 2014-122290

(51) Int. Cl.
*B62D 5/04* (2006.01)
*G07C 5/08* (2006.01)

(52) U.S. Cl.
CPC ........... *B62D 5/049* (2013.01); *B62D 5/0463* (2013.01); *B62D 5/0484* (2013.01); *G07C 5/0808* (2013.01)

(58) Field of Classification Search
CPC .... B62D 5/0463; B62D 5/0484; B62D 5/049; G07C 5/0808
See application file for complete search history.

(56) References Cited

U.S. PATENT DOCUMENTS 5,552,684 A     9/1996 Wada et al.
6,795,762 B2 *  9/2004 Itoh ...................... B62D 5/0484
                                             180/421
(Continued)

FOREIGN PATENT DOCUMENTS

EP    0721876 A2    7/1996
EP    1095841 A2    5/2001
(Continued)

OTHER PUBLICATIONS

International Search Report for PCT/JP2015/066969 dated Sep. 8, 2015.
(Continued)

*Primary Examiner* — Khoi H Tran
*Assistant Examiner* — Donald Joseph Wallace
(74) *Attorney, Agent, or Firm* — Sughrue Mion, PLLC

(57) ABSTRACT

A power-source voltage diagnostic device of an electric power steering apparatus that improves the performance for the anomalous detection of the motor power-source voltage VR-detecting circuit and is capable of continuing the assist control even if the extraordinary state is detected. When the failure (extraordinary state) detection of the VR-detecting circuit is performed by using the correlation between Vbat1-voltage obtained by the detecting section (Vbat1-detecting circuit) to detect the control voltage from the control power-source circuit and VR-voltage obtained by the detecting circuit (VR-detecting circuit) to detect the motor power-source voltage from the power source circuit, multiplexing is performed by providing VR-detecting circuits (VR-detecting circuit 1, VR-detecting circuit 2) of two systems and mutually comparing them so as to accurately perform the failure diagnosis of the VR-detecting circuits.

7 Claims, 3 Drawing Sheets

(56) References Cited

U.S. PATENT DOCUMENTS

| | | | |
|---|---|---|---|
| 8,209,079 B2* | 6/2012 | Nakane | B62D 5/0484 |
| | | | 701/29.1 |
| 8,963,468 B2* | 2/2015 | Ito | B62D 5/049 |
| | | | 318/490 |
| 2005/0264248 A1* | 12/2005 | Tsunoda | B62D 5/049 |
| | | | 318/434 |
| 2007/0069674 A1* | 3/2007 | Koeppl | B62D 5/0484 |
| | | | 318/432 |

FOREIGN PATENT DOCUMENTS

| | | |
|---|---|---|
| JP | 2009-161156 A | 7/2009 |
| JP | 2011-58979 A | 3/2011 |
| WO | 2007055101 A1 | 5/2007 |

OTHER PUBLICATIONS

Communication dated Sep. 6, 2017, from the European Patent Office in counterpart European Application No. 15806157.2.

* cited by examiner

PRIOR ART

POWER-SOURCE VOLTAGE DIAGNOSTIC DEVICE OF ELECTRIC POWER STEERING APPARATUS

CROSS REFERENCE TO RELATED APPLICATIONS

This application is a National Stage of International Application No. PCT/PCT/JP2015/066969 filed Jun. 12, 2015, claiming priority based on Japanese Patent Application No. 2014- 122290 filed Jun. 13, 2014, the contents of all of which are incorporated herein by reference in their entirety.

TECHNICAL FIELD

The present invention relates to a power-source voltage diagnostic device of an electric power steering apparatus which applies a steering assist force (assist force) to a steering mechanism of a vehicle by a motor rotational torque.

BACKGROUND ART

An electric power steering apparatus that energizes a steering mechanism of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the assist torque (steering assist torque), such a conventional electric power steering apparatus (EPS) performs a feedback control of a motor current. The feedback control adjusts a voltage supplied to the motor so that a difference between a current command value and the motor current becomes small, and the adjustment of the voltage applied to the motor is generally performed by an adjustment of a duty ratio of a pulse width modulation (PWM) control.

A general constitution of a conventional electric power steering apparatus will be described with reference to FIG. 1. As shown in FIG. 1, a column shaft (a steering shaft, handle shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Th of the steering wheel 1, and a motor 20 for assisting the steering force of the steering wheel 1 is connected to the column shaft 2 through the reduction gears 3 (reduction ratio n). Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Th detected by the torque sensor 10 and a vehicle speed Vel detected by a vehicle speed sensor 12, and controls a current supplied to the motor 20 based on a voltage command value Vref obtained by performing compensation and so on with respect to the current command value in a current control section. A steering angle sensor 14 is not indispensable and may not be provided.

A controller area network (CAN) 50 to send/receive various information and signals on the vehicle is connected to the control unit 30, and it is also possible to receive the vehicle speed Vel from the CAN 50. Further, a Non-CAN 51 is also possible to connect to the control unit 30, and the Non-CAN 51 sends and receives a communication, analogue/digital signals, electric wave or the like except for the CAN 50.

In such the electric power steering apparatus, there has been conventionally provided a VR-detecting circuit from a motor power-source circuit and a detecting circuit of a control voltage Vbat1 from a control power-source circuit, and an extraordinary (abnormal) state detection of a motor power-source voltage VR detecting circuit is performed by supervising a correlation between detected voltage values of the power-source voltage VR and the control voltage Vbat1. This is a method to utilize a fact that a correlation relation between the power-source voltage VR and the control voltage Vbat1 does not basically and greatly come off. As a prior art used such correlation relation, an extraordinary state detecting means is disclosed, for example, in Patent document 1 (Japanese Published Unexamined Patent Application No. 2009-161156).

THE LIST OF PRIOR ART DOCUMENTS

Patent Documents

Patent Document 1: Japanese Published Unexamined Patent Application No 0.2009-161156 A1

SUMMARY OF THE INVENTION

Problems to be Solved by the Invention

However, for example, as disclosed in Patent Document 1, in a case of a circuit constitution having a current route from the battery to a system power-source section through a diode, generally there is a possibility that the power-source voltage from the motor power-source circuit and the control voltage from the control power source greatly comes off from a normal correlation relation. Therefore, it is necessary to take measures to meet the situation by mitigating a diagnostic threshold in order to prevent a false detection.

But, in the case of the above measures to mitigate the diagnostic threshold, there is a problem that a performance of the extraordinary state detection of the VR-detecting circuit. That is, in the current control of the electric power steering apparatus, the detected value of the motor power-source voltage VR is referred at a time of the duty calculation, the current is increased by increasing the duty when the voltage is low. Consequently, if the detected voltage becomes smaller than an actual voltage due to the detecting failure of the motor power-source voltage VR, there is a possibility to become to an excessive assist.

Therefore, in the above prior art, it is desired to improve the performance of the failure detection in the detecting circuit of the motor power-source voltage VR.

The present invention has been developed in view of the above-described circumstances, and an object of the present invention is to provide a power-source voltage diagnostic device of an electric power steering apparatus that multiplexes the VR-detecting circuit and is capable of effectively preventing an occurrence of a phenomenon such as the excessive assist by accurately performing an anomalous diagnosis of the VR-detecting circuit.

Means for Solving the Problems

The present invention relates to a power-source voltage diagnostic device of an electric power steering apparatus that drives a motor by means of a current command value calculated based on at least a steering torque and assist-controls a steering system through a reduction mechanism, the above-described object of the present invention is achieved by that wherein said power-source voltage diagnostic device comprising: a detecting section (Vbat1-detecting circuit) to detect a control voltage from a power source circuit for control; two detecting circuits (VR-detecting circuit 1, VR-detecting circuit 2) to detect power-source voltages from said power source circuit; and a diagnostic section to diagnose based on an output Vbat1 from a detecting section of said control voltage and respective output voltages (VR1, VR2) from said detecting circuits (VR-detecting circuit 1, VR-detecting circuit 2) of said power-source voltage; wherein said diagnostic section supervises a correlation between said output Vbat1 from said detecting section of said control voltage and said respective output voltages (VR1, VR2) from said detecting circuits of said power-source voltage and performs a failure diagnosis.

Further, the above-described object of the present invention is more effectively achieved by that wherein a supervision of said correlation is performed by said failure diagnosis that gets a ratio between said output voltage VR1 and said output voltage VR2 and judges whether a size of said ratio is between diagnostic thresholds A and B or not; or wherein a VR-failure place judgment is performed when an extraordinary state is detected by said failure diagnosis, and said VR-failure place judgment judges either detecting circuit of said VR-detecting circuit 1 and said VR-detecting circuit 2 is an extraordinary state; or wherein said power-source voltage diagnostic device further includes a VR-selecting section, in a case that said ratio (VR1/VR2) of said output voltages (VR1, VR2) from said detecting circuits of said power-source voltage in said failure diagnosis does not exist in a range which is more than a diagnostic threshold A and is less than a diagnostic threshold B (A<(VR1/VR2)<B), based on judging thresholds C and D, a VR-detecting circuit 1 is judged as an extraordinary state when (VR1/Vbat1)<C or D<(VR1/Vbat1), and a VR-detecting circuit 2 is judged as an extraordinary state when (VR2/Vbat1)<C or D<(VR2/Vbat1), wherein an output voltage of either one for said VR-detecting sections that is judged as an ordinary state in said judgment, is inputted into a duty control section by said VR-selecting section; or wherein when both detecting circuits are judged as extraordinary states in said failure diagnosis, at least one diagnostic threshold and at least one judging threshold of said diagnostic thresholds A and B or said judging thresholds C and D are mitigated and a second diagnosis or a second judgment is performed, and an amount of said steering assist is limited based on a result of said second diagnosis or said second judgment and mitigated diagnostic threshold or mitigated judging threshold.

Effects of the Invention

The present invention has a constitution that multiplexes the detecting circuit of the power-source voltage VR, mutually compares the detecting circuits (VR-detecting circuit 1, VR-detecting circuit 2) of two systems and accurately detects the failure of the VR-volt age detection irrespective of the condition change such as a temperature change. Therefore, it is possible to assist-control at a high reliability.

Further, the present invention determines the failure of either VR-detecting circuit of two systems by using a correlation relation with the voltage Vbat1 after the detection of the failure and can continues the assist control at a high reliability by using a VR-detected value of the VR-detecting circuit judged as the ordinary state.

Furthermore, even if the VR-detecting circuits of the two systems are judged as the extraordinary state, the present invention can again perform the failure diagnosis by mitigating a value of the judging threshold C or D in a case judging the correlation relation with the voltage Vbat1 in order to judge that either detecting circuit is the failure for values of the diagnostic thresholds A, B for detecting the failure due to the correlation relation of the VR-detecting circuits or the VR-detecting circuits of the two systems. In this connection, it is possible to prevent the excessive assist at a double failure time by limiting the assist amount corresponding to degree (for example, a ratio of the thresholds before and after the mitigation which is stored in advance, and so on) of the diagnostic thresholds or the judging thresholds even if a detecting performance of an intermittent failure abates.

Still further, since the power-source voltage VR is used for an initial diagnosis or the like, it is possible to improve the reliability of all diagnosis using the VR-detected value.

MODE FOR CARRYING OUT THE INVENTION

Figure 1:
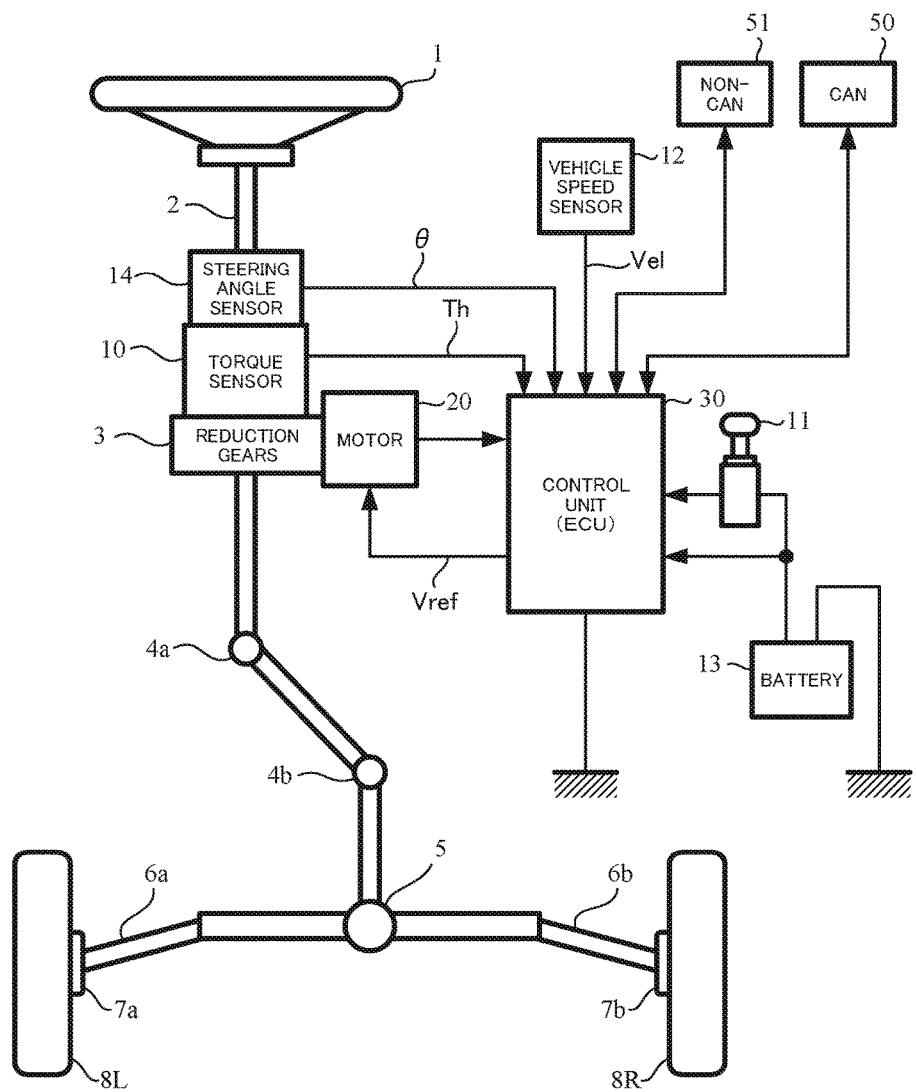
FIG. 1 is a diagram illustrating a constitution example of a general electric power steering apparatus.

Next, an embodiment of the present invention will be described with reference to FIG. 2 and FIG. 3. The constitution parts common to FIG. 1 are used the same reference numerals.

Figure 2:
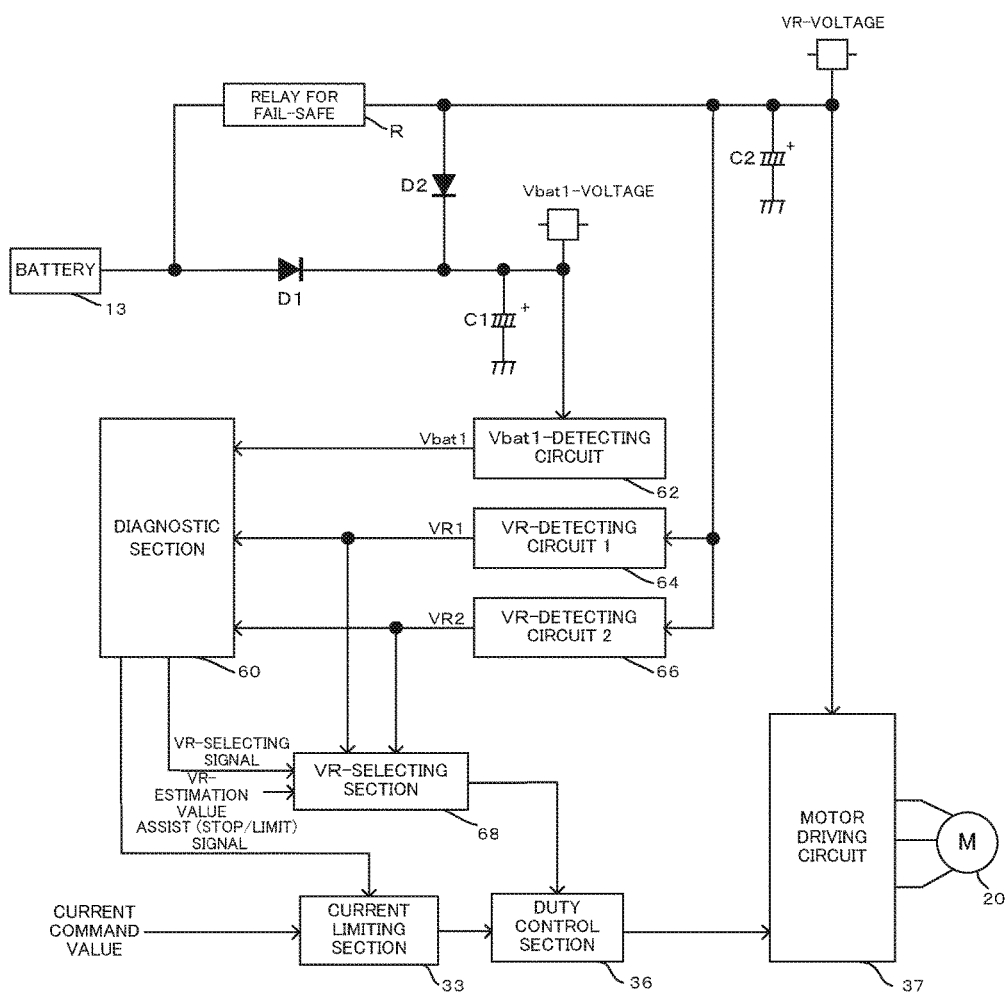
FIG. 2 is a block diagram showing an example of the present invention.

FIG. 2 shows a basic constitution example of a power-source voltage diagnostic device of the electric power steering apparatus according to the present invention, and the power-source voltage diagnostic device is basically incorporated into the control unit (ECU) 30.

As shown in FIG. 2, the present embodiment comprises a relay (R) for fail-safe between a battery (13) serving as a power source and a motor power-source (VR-voltage) from a motor power-source circuit and a reverse connection preventing diode (D1) between the battery (13) and the control power-source (Vbat1-voltage). Further, the motor power source (VR-voltage) and the control power source (Vbat1-voltage) are connected each other through a diode (D2) of which forward direction is from the motor power-source to the control power-source.

A function of the diode (D2) is that: since an electric power is capable of supplying to a system through the diode (D2) when the diode (D2) is open-broken at an ordinary time, an assist is continued till an OFF of the ignition key (11). Another function of the diode (D2) is that: when the voltage of the battery (13) falls down at a time of cranking or the like, the relay (R) for fail-safe is closed and charges are charged in an electrolytic capacitor (C2) of the motor power-source (VR-voltage) are supplied to the control power-source (Vbat1-voltage) through the diode (D2). In these ways, it is possible to make a delay of a time that control power-source (Vbat1-voltage) falls down to a reset voltage of a micro controller unit (MCU) such as the control unit (30).

Further, two systems of a VR-detecting circuit 1 (64) and a VR-detecting circuit 2 (66) are provided with the motor power-source (VR-voltage) serving as a detecting means of the motor power-source (VR-voltage), and one system of a Vbat1-detecting circuit (62) is provided with the control power-source (Vbat1) serving as a detecting means of the control power-source (Vbat1-voltage).

Then, an output voltage VR1 of the VR-detecting circuit 1 (64) and an output voltage VR2 of the VR-detecting circuit 2 (66) are connected to a diagnostic section (60) and a VR-selecting section (68).

Moreover, the Vbat1-detecting circuit and the VR-detecting circuit, or the VR-detecting circuit 1 and the VR-detecting circuit 2 are respectively desired to the same circuit constitution.

The diagnostic section (60) performs the failure diagnosis on the above detecting circuits and outputs a VR-selecting signal to the VR-selecting section (68) or outputs an assist (stop/limit) signal to the current limiting section (33) in accordance with the diagnostic result.

Further, the VR-selecting section (68) is also connected to a duty control section (36), and the VR-selecting section (68) selects either the voltage VR1 or VR2 by inputting the diagnostic result in the diagnostic section (60) and inputs a selected voltage into the duty control section (36). In a case that the extraordinary (abnormal) state or the like on the VR-detecting circuits is detected in the diagnostic section (60), a separately-calculated VR-estimation value is inputted into the VR-selecting section (68) and then is inputted into the duty control section (36).

The motor power-source (VR-voltage) is connected to a motor driving circuit (37), and the control of the motor driving circuit (37) is performed with the duty value decided in the duty control section (36) to adjust the motor applying voltage.

Furthermore, a current limiting section (33) is connected to the duty control section (36), and a current command value and the assist (stop/limit) signal are inputted into the current limiting section (33). The current command value is calculated in a current command value calculating section (not shown) based on the steering torque (Th) and the vehicle speed (Vel). The current command value of which the maximum value is limited in the limiting section (33), is inputted into the duty control section (36).

Next, the operational example of the power-source voltage diagnostic device of the electric power steering apparatus will be described with reference to FIG. 3.

In the power-source voltage diagnostic device of the present invention, the control voltage Vbat1 from the control power-source circuit is inputted into the diagnostic section (60) through the Vbat1-detecting circuit (62) and similarly the motor power-source voltage VR from the motor power-source circuit is inputted into the diagnostic section (60) through the VR-detecting circuit 1 (64) and the VR-detecting circuit 2 (66).

Figure 3:
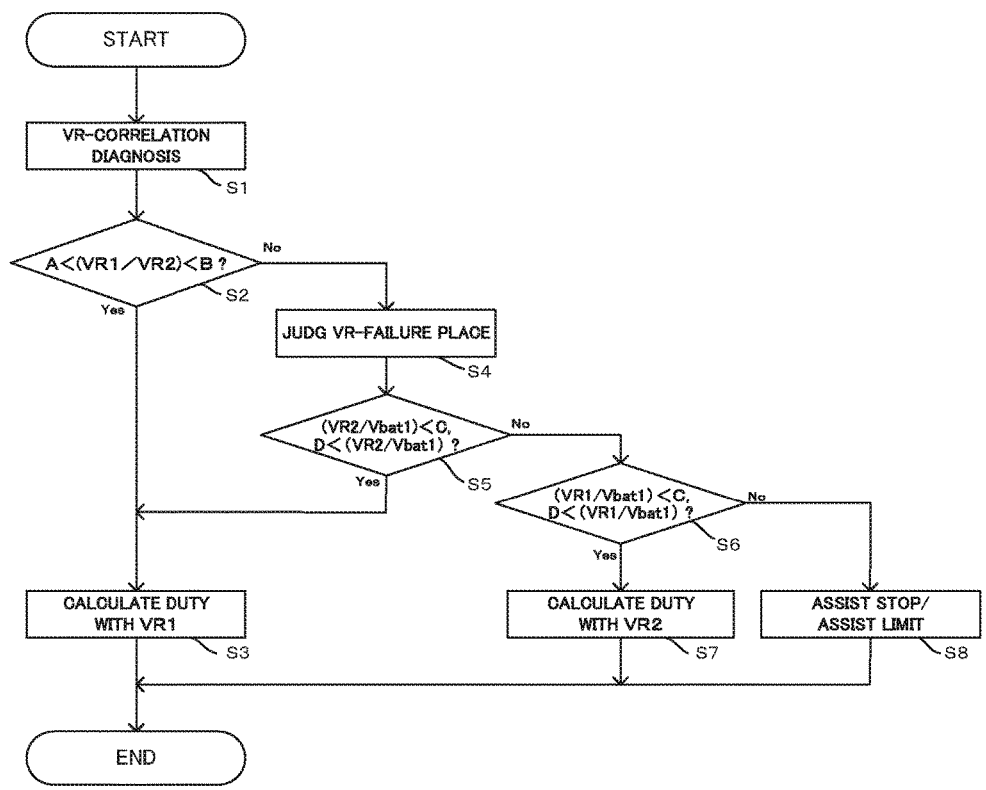
FIG. 3 is a flow chart showing an example of a diagnostic operation in the diagnostic section according to the present invention.

In this connection, first, a VR-correlation diagnosis is performed in the diagnostic section (60) as shown in FIG. 3 (Step S1). Concretely, the VR-correlation diagnosis obtains a ratio (VR1/VR2) of the voltages VR1 and VR2 and judges whether a size of the ratio is between the diagnostic thresholds A and B or not (Step S2).

As a result, if the ratio VR1/VR2 is more than the diagnostic threshold A and is less than the diagnostic threshold B (A<(VR1/VR2)<B), the diagnostic section (60) judges that the power-source voltage (VR) is an ordinary state and inputs a command to the VR-selecting section (68). The duty control section (36) inputs the voltage VR1 from the VR-selecting section (68) and calculates the duty by using the voltage VR1 (Step S3).

On the other hand, if the ratio VR1/VR2 is equal to or less than the diagnostic threshold A (VR1/VR2≤A) or is equal to or more than the diagnostic threshold B (B≤VR1/VR2) (where A<B), a VR-failure place judgment is performed (Step S4).

The above VR-failure place judgment step is a judgment either the VR-detecting circuit 1 or the VR-detecting circuit 2 is the extraordinary state or the failure.

Then, at the VR-failure place judgment step, an existence of the extraordinary state on the VR-detecting circuit 2 (66) is first judged (Step S5). The judgment of the existence of the extraordinary state is performed whether the ratio (VR2/Vbat1) of the voltages VR2 and Vbat1 is less than the judging threshold C (e.g. C=0.8) or not, or whether the ratio (VR2/Vbat1) is more than the judging threshold D (e.g. D=1.2).

As a result, if the ratio VR2/Vbat1 is less than the judging threshold C or is more than the judging threshold D, the diagnostic section (60) judges that the voltage VR2 is the extraordinary state. In this case, the step forwards to the Step S3 and the diagnostic section (60) outputs the VR-selecting signal to the VR-selecting section (68). The duty control section (36) inputs the voltage VR1 from the VR-selecting section (68) and calculates the duty based on the voltage VR1.

Further, at the above Step S5, in a case that no-failure on the voltage VR2 is judged, then the existence of the extraordinary state on the VR-detecting circuit 1 (64) is judged (Step S6). That is, the existence-judgment of the extraordinary state on the VR-detecting circuit 1 (64) is performed whether the ratio (VR1/Vbat1) of the voltages VR1 and Vbat1 is less than the judging threshold C or not, or whether the ratio (VR1/Vbat1) is more than the judging threshold D.

As a result, if the ratio VR1/Vbat1 is less than the judging threshold C or is more than the judging threshold D ((VR1/Vbat1)<C, or D<(VR1/Vbat1)), the diagnostic section (60) judges that the voltage VR1 is the extraordinary state and forwards to the Step S7. Then, the diagnostic section (60) outputs the VR-selecting signal to the VR-selecting section (68), and the duty control section (36) inputs the voltage VR2 from the VR-selecting section (68) and calculates the duty based on the voltage VR21.

On the other hand, in a case that no-existence of the extraordinary state on the voltage VR1 is judged, the failure place is not determined since the failure is detected from the VR-correlation diagnosis nevertheless one side of the VR-detecting circuit 1 and the VR-detecting circuit 2 is not judged as the failure place. Therefore, in this case, the assist is stopped or the assist itself is continued by outputting a signal to limit the assist amount to the current limiting section (33) from the diagnostic section (60) and limiting the assist amount (Step S8).

In the case limiting the assist amount as stated above, it is possible to estimate the motor power-source voltage VR from a motor voltage (terminal-to-terminal), the duty of PWM and so on based on the memory data stored the characteristic of the failure time. Since the reliability of the control using such estimated value is low, the present invention performs the limited assist that the maximum current is limited and a characteristic gain on the input torque-following current is decreased.

Further, in the case limiting the assist amount stated above, the present invention mitigates either one or plural diagnostic thresholds or the judging thresholds of the diagnostic thresholds A and b or the judging thresholds C and D with a predetermined degree, and again performs the above judgment based on the mitigated diagnostic threshold(s) or the mitigated judging threshold(s). It is possible to utilize the obtained new voltage VR1 or VR2 for estimating the motor power-source voltage VR. In that case, it is possible to perform the assist that the assist amount is limited corresponding to the degree (e.g. the ratio of the thresholds before and after the mitigation) of the mitigated diagnostic threshold(s) or the judging threshold(s).

Moreover, the mitigation of the diagnostic threshold(s) or the judging threshold(s) means that regarding the diagnostic threshold A and the judging threshold C, the values are decreased than previous values and regarding the diagnostic threshold B and the judging threshold D, the values are increased than previous values.

In the case mitigating the diagnostic thresholds and the judging thresholds, because it is possible to continue the steering assist due to the diagnostic result based on the new diagnostic thresholds and the new judging thresholds even if the extraordinary state on the power-source voltage VR is detected based on the previous diagnostic thresholds and the previous judging thresholds, it is possible to reduce the steering load of a driver. Further, in a case that the extraordinary states on the voltages VR1 and VR2 are judged even if the second diagnosis or judgment is performed, the assist is stopped or the assist is continued by further limiting the assist amount.

As stated above, according to the present invention, it is possible to improve the performance of the extraordinary state detection on the motor driving power-source voltage and to continue the assist by limiting the assist amount thereby to lighten the load of the driver.

EXPLANATION OF REFERENCE NUMERALS 1 handle
2 column shaft (steering shaft, handle shaft)
4a, 4b universal joint
5 pinion and lack mechanism
6a, 6b tie rod
7a, 7b hub unit
8L, 8R steered wheel
10 torque sensor
11 ignition key
12 vehicle speed sensor
13 battery
20 motor
30 control unit (ECU)
33 current limiting section
36 duty control section
37 motor driving section
60 diagnostic section
62 Vbat1-detecting circuit
64 VR-detecting circuit 1
66 VR-detecting circuit 2
68 VR-selecting section
A B diagnostic threshold
C D judging threshold
D1 D2 diode
C1 C2 electrolytic capacitor
R relay for fail-safe

The invention claimed is:
1. A power-source voltage diagnostic device of an electric power steering apparatus that drives a motor by means of a current command value calculated based on at least a steering torque and assist-controls a steering system through a reduction mechanism, wherein said power-source voltage diagnostic device comprising:
    a detecting section, Vbat1-detecting circuit, to detect a control voltage from a power source circuit for control;
    two detecting circuits, VR-detecting circuit 1, VR-detecting circuit 2, to detect power- source voltages from said power source circuit; and
    a diagnostic section to diagnose based on an output Vbat1 from said detecting section of said control voltage and respective output voltages VR1, VR2 from said detecting circuits VR-detecting circuit 1, VR-detecting circuit 2 of said power-source voltage,
    wherein said diagnostic section supervises a correlation between said output Vbat1 from said detecting section of said control voltage and said respective output voltages VR1, VR2 from said detecting circuits of said power-source voltage and performs a failure diagnosis, and
    wherein a VR-failure place judgment is performed when an extraordinary state is detected by said failure diagnosis, and said VR-failure place judgment judges either detecting circuit of said VR-detecting circuit 1 and said VR-detecting circuit 2 is an extraordinary state.
2. The power-source voltage diagnostic device of an electric power steering apparatus according to claim 1, wherein a supervision of said correlation is performed by said failure diagnosis that gets a ratio between said output voltage VR1 and said output voltage VR2 and judges whether a size of said ratio is between diagnostic thresholds A and B or not.
3. The power-source voltage diagnostic device of an electric power steering apparatus according to claim 1, wherein said power-source voltage diagnostic device further includes a VR-selecting section,
    in a case that a ratio VR1/VR2 of said output voltages VR1, VR2 from said detecting circuits of said power-source voltage in said failure diagnosis does not exist in a range which is more than a diagnostic threshold A and is less than a diagnostic threshold B, A<(VR1/VR2)<B,
    based on judging thresholds C and D, a VR-detecting circuit 1 is judged as an extraordinary state when (VR1/Vbat1)<C or D<(VR1/Vbat1), and a VR-detecting circuit 2 is judged as an extraordinary state when (VR2/Vbat1)<C or D<(VR2/Vbat1), and
    wherein an output voltage of either one for said VR-detecting sections that is judged as an ordinary state in said judgment, is inputted into a duty control section by said VR-selecting section.
4. The power-source voltage diagnostic device of an electric power steering apparatus according to claim 2, wherein said power-source voltage diagnostic device further includes a VR-selecting section,
    in a case that said ratio VR1/VR2 of said output voltages VR1, VR2 from said detecting circuits of said power-source voltage in said failure diagnosis does not exist in a range which is more than a diagnostic threshold A and is less than a diagnostic threshold B, A<(VR1/VR2)<B,
    based on judging thresholds C and D, a VR-detecting circuit 1 is judged as an extraordinary state when (VR1/Vbat1)<C or D<(VR1/Vbat1), and a VR-detecting circuit 2 is judged as an extraordinary state when (VR2/Vbat1)<C or D<(VR2/Vbat1), and wherein an output voltage of either one for said VR-detecting sections that is judged as an ordinary state in said judgment, is inputted into a duty control section by said VR-selecting section.

5. The power-source voltage diagnostic device of an electric power steering apparatus according to claim 1, wherein when both detecting circuits are judged as extraordinary states in said failure diagnosis, at least one diagnostic threshold and at least one judging threshold of diagnostic thresholds A and B or judging thresholds C and D are mitigated and a second diagnosis or a second judgment is performed, and an amount of said steering assist is limited based on a result of said second diagnosis or said second judgment and mitigated diagnostic threshold or mitigated judging threshold.

6. The power-source voltage diagnostic device of an electric power steering apparatus according to claim 2, wherein when both detecting circuits are judged as extraordinary states in said failure diagnosis, at least one diagnostic threshold and at least one judging threshold of said diagnostic thresholds A and B or judging thresholds C and D are mitigated and a second diagnosis or a second judgment is performed, and an amount of said steering assist is limited based on a result of said second diagnosis or said second judgment and mitigated diagnostic threshold or mitigated judging threshold.

7. The power-source voltage diagnostic device of an electric power steering apparatus according to claim 4, wherein when both detecting circuits are judged as extraordinary states in said failure diagnosis, at least one diagnostic threshold and at least one judging threshold of said diagnostic thresholds A and B or said judging thresholds C and D are mitigated and a second diagnosis or a second judgment is performed, and an amount of said steering assist is limited based on a result of said second diagnosis or said second judgment and mitigated diagnostic threshold or mitigated judging threshold.

* * * * *